Oct. 26, 1954
T. N. LEWIS
2,692,955
REMOTELY ADJUSTABLE THERMOSTAT
Filed Nov. 10, 1951
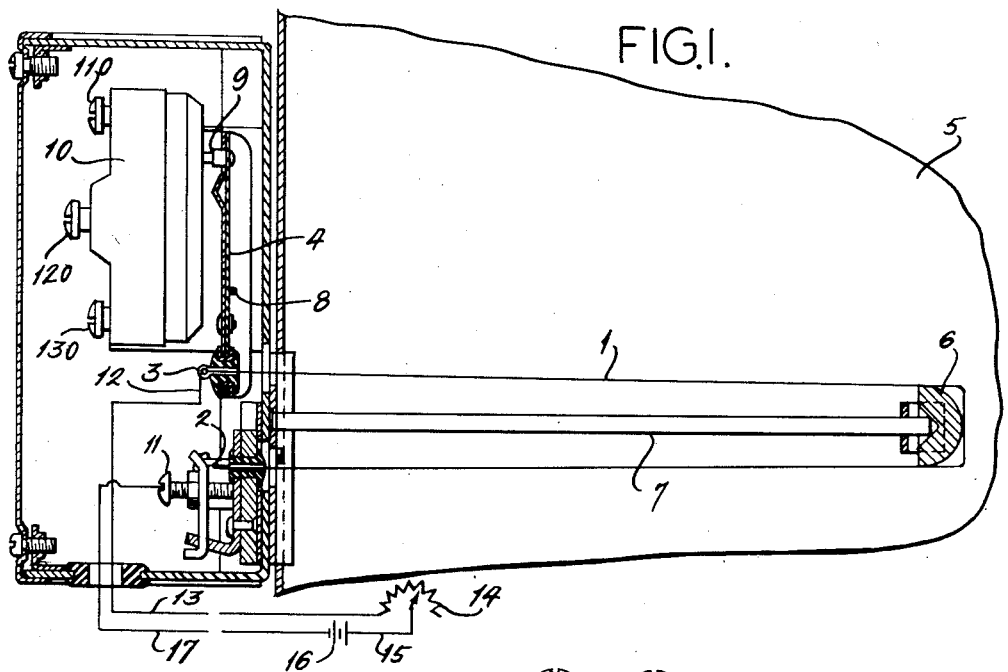
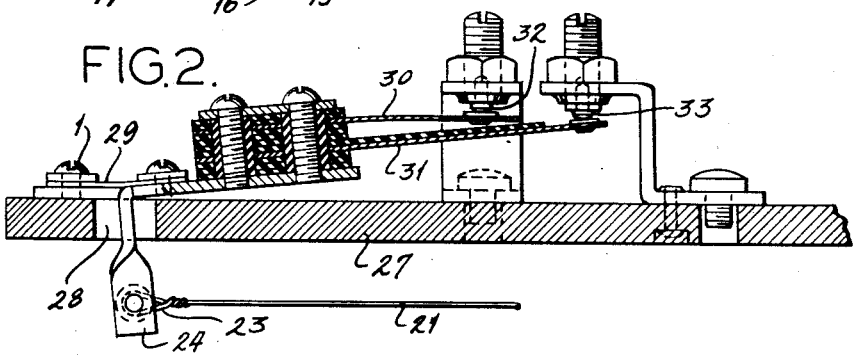
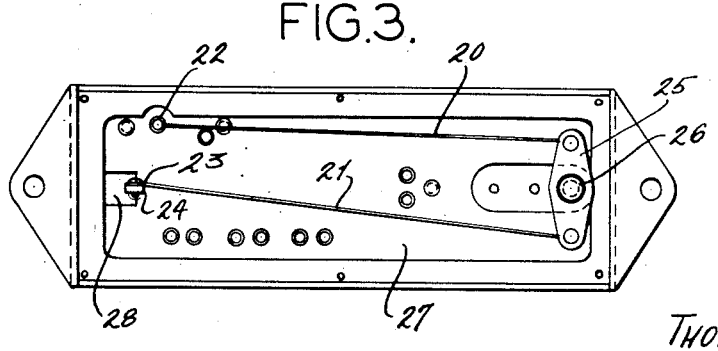
INVENTOR:
THOMAS N LEWIS
By Brannigan and Seatherland
ATTORNEYS.

Patented Oct. 26, 1954

2,692,955

UNITED STATES PATENT OFFICE 2,692,955

REMOTELY ADJUSTABLE THERMOSTAT

Thomas N. Lewis, St. Louis, Mo., assignor to McQuay-Norris Manufacturing Company, St. Louis, Mo., a corporation of Delaware Application November 10, 1951, Serial No. 255,814

4 Claims. (Cl. 307—117)

This invention relates generally to thermostats, and particularly to adjusting the characteristics of a thermostat from a remote point.

There are many instances in the industrial arts where it is desired to vary the temperature at which a thermostat responds, and to accomplish such variation from a remote point. Heretofore such remote adjustability has been accomplished by the provision of a liquid-filled thermostat with with its bulb in the zone whose temperature is to be controlled, but with a capillary tube leading from the bulb to the remote position where the adjustment is to be made. Such arrangements are not only expensive to install, but the longer the run of capillary tube, the greater the hazard that the thermostat may be rendered inoperative by damage to the tube; and furthermore, unless compensating means is provided, the effect of the thermostat is modified by the effect of ambient temperature on the liquid in the capillary tube.

The object of the present invention is to provide a remotely controllable thermostat wherein the characteristics of the thermostat are varied by an electrical circuit.

The invention contemplates that this object be achieved by providing a hot-wire-type thermal element, which is not only exposed to the temperature in the region where control is desired, but, in addition, is exposed to the heating action of an electric current, the magnitude of which is remotely controlled. Consequently, the response of the thermal element is determined by composite heating influences, one of which is remotely adjustable. The thermostat is therefore calibrated so that, at a given temperature of the hot-wire element, whether such temperature is brought about by extrinsic heating (from the atmosphere surrounding the thermal element) or by intrinsic heating (from the electric current flowing through the wire), it actuates an electric switch controlling the energization of a heater or cooler, as the case may be.

Other objects and advantages of the invention will become apparent to those skilled in the art when the following description is read in connection with the accompanying drawings, in which:

Figure 1 is a view in side elevation, part being broken away to reveal the relationship of the elements, of a thermostat constructed in accordance with the present invention, associated with a chamber whose temperature it is desired to remotely control, and showing the electrical circuit to the station of remote control;

Figure 2 is a longitudinal sectional view of another embodiment of the switch; and Figure 3 is a bottom plan view of the switch shown in Fig. 2.

Referring now to Figure 1 of the drawings for an illustrative embodiment of the invention, the thermostat consists of a length of readily expansible and contractible wire 1, preferably of Nichrome alloy, one end 2 of which is anchored to a fixed point, and the other end 3 of which is anchored to a switch-actuating member 4. In the embodiment shown, the wire 1 extends as a loop within a chamber 5, whose temperature it is desired to control. The bight of the loop of wire 1 is supported by a shoe 6, whose position is fixed relative to the anchorage at end 2. In order to substantially eliminate variation in the lineal distance between anchorage 2 and shoe 6, the latter may be sustained by a rod 7 of any inexpansible material, such as Invar alloy, which is in turn mounted closely adjacent anchorage 2 and in such manner that expansion and contraction between the base of rod 7 and anchorage 2 is held to a minimum.

The switch-actuating member 4 may be a lever fulcrumed at 8, so as to provide a relatively short lever arm to anchorage 3 of wire 1. On the opposite side of fulcrum 8, and at a substantially greater distance therefrom, lever 4 engages button 9 of a conventional microswitch 10. In the embodiment shown in the drawings, the switch 10 is provided with three contact terminals 110, 120, and 130, whereby two circuits may be controlled from one motion of the button 9, one circuit being normally open, the other being normally closed. These circuits, it will be understood, extend to suitable heating and/or cooling devices, not shown, whose energization it is desired to control.

The Nichrome wire 1 is secured at 3 to lever 4 in such manner that it is electrically insulated from the latter, but capable of applying a mechanical force thereto. The wire 1 extends through the wall of chamber 5 in insulated relationship and is appropriately insulated from all other proximate conductive parts, so as to avoid the possibility of short-circuiting the wire 1, or any part thereof, out of an electrical circuit connected to the ends 2 and 3 thereof.

The fixed anchorage 2 is mounted in conductive relationship with a binding post 11. The movable anchorage 3 is connected through a pigtail 12 to another binding post, not shown, from which a conductor 13 extends to a remote point at which it is desired to control the responding temperature of the thermostat. At such remote point, conductor 13 is connected to a variable rheostat 14, whose opposite side is connected through a conductor 15 to a suitable source of energy 16, shown for illustration as a battery, and from thence a conductor 17 extends to the binding post 11.

With an arrangement of the character above described, it will be apparent that the less the resistance of rheostat 14, which is in the circuit at any increment of time, the greater will be the current flowing through wire 1, and the more said wire will be intrinsically heated by such current. Accordingly, when it is desired to lower the temperature within chamber 5, more resistance of rheostat 14 is cut into the circuit and, conversely, when it is desired to increase the temperature of chamber 5, the amount of resistance at rheostat 14 is decreased. The temperature within chamber 5 is, therefore, but one of two factors influencing the expansion and contraction of wire 1, the other factor being remotely controllable by varying the amount of current flowing through wire 1. It is the temperature of wire 1 which determines the lineal expansion and contraction thereof, and it is the latter which moves lever 4 in one direction or the other. In the embodiment shown, either button 9 or lever 4 may be spring-biased in a direction tending to move the lever in the clockwise direction about its fulcrum 8, while contraction of wire 1 will move the lever in the counterclockwise direction about its fulcrum.

The looping of wire 1 about fixed shoe 6 constitutes a convenient way of multiplying the movement of end 3 thereof, and to secure an amplitude of movement which is sufficient, when combined with the purchase of lever 4, to actuate microswitch 10 when and as desired.

In the embodiment shown in Figures 2 and 3, a hot wire is divided into two sections 20 and 21. One end 22 of section 20 is anchored to a fixed post. One end 23 of wire 21 is anchored to a lever 24. The opposite ends of wires 20 and 21 are secured to an equalizer bar 25 which, if made of electrically conductive material, constitutes an electrical connection between wires 20 and 21. If, on the other hand, bar 25 is made of insulating material, a suitable electrical connection is provided between wires 20 and 21. The equalizer bar 25 is mounted on a pivot pin 26 in fixed lineal displacement from fixed end 22 of wire 20, as by the provision of a mounting base 27, formed of substantially inexpansible material, upon which pivot pin 26 is mounted, and to which end 22 of wire 20 is anchored. In this embodiment, the wires 20 and 21 are exposed within a chamber whose temperature it is desired to control and, as in the previous embodiment, said wires also constitute a part of a remotely controllable electric circuit.

Lever 24 extends through an aperture 28 in base 27 and thereabove is connected with a leaf spring 29, one end of which is secured to base 27. Upon the portion of lever 24 which overlies base 27, a pair of spring contact fingers 30 and 31 are mounted in insulated relationship and arranged to make contact respectively with stationary contacts 32 and 33, which control the power circuit to devices for heating or cooling the adjacent chamber in which wires 20 and 21 are located.

Suitable binding posts are provided for making electrical connection with ends 22 and 23 of wires 20 and 21, and said binding posts are connected with a remote circuit corresponding to the circuit between conductors 13 and 17 of the previous embodiment.

In the position shown in Figure 2, the wires 20 and 21 are relatively cool, as the switch is in its closed position, but as in the previous embodiment, when it is desired to increase the temperature at which contacts 30 and 31 engage contacts 32 and 33, all that is necessary is to increase the electric current flowing through wires 20 and 21, thereby increasing the temperature of these wires and causing them to expand.

In the embodiment shown in Figures 2 and 3, the lineal expansion of the hot wire is multiplied by forming an effective loop thereof through equalizer bar 25, which produces at end 23 a movement corresponding to the cumulative expansion of wires 20 and 21. Again, as in the previous embodiment, the movable end of the hot wire is connected to the short arm of a switch-actuating lever, so that the amplitude of movement at the contacts is greater than the amplitude of movement of the movable end of the hot wire.

From the foregoing description those skilled in the art should readily understand that the invention accomplishes its object and provides a cheap, easy, and safe manner of remotely varying the temperature within a temperature control chamber at which a thermostat will actuate a switch. While two embodiments of the invention have been described in detail, it is not to be understood that the invention is limited to those embodiments, but, on the contrary, it is realized that those skilled in the art will immediately visualize modifications and adaptations of the principles of the invention which are not herein described. It is to be distinctly understood, therefore, that such modifications, variations, and adaptations as do not depart from the spirit of the invention are, although not specifically described herein, contemplated by and within the scope of the appended claims.

Having thus described the invention, what is claimed and desired to be secured by Letters Patent is:

1. In a device for controlling the temperature in a chamber, the combination with a switch for controlling an electric circuit, said switch having an operating device controlled by a hot wire thermostat situated to be responsive to ambient temperature in said chamber and insulated from the electric circuit controlled by said switch, of an auxiliary electric circuit including, in series, said hot wire thermostat, a source of energy, and a current modulator, said current modulator being situated remotely from said hot wire thermostat.

2. Apparatus as set forth in claim 1, wherein said hot wire thermostat is a generally U-shaped element with legs formed of thin wire, one end of said U-shaped element being fixed and the other end being relatively movable and coupled for control of said switch, and a fixed member supporting the bight of said U-shaped element, said supporting member having a coefficient of thermal expansion substantially less than that of said wire.

3. Apparatus as set forth in claim 2, wherein said U-shaped element is constituted by a loop of wire trained about said supporting element.

4. Apparatus as set forth in claim 2, wherein said U-shaped element comprises a bar and two lengths of wire extending from opposite ends of said bar, said bar being pivotally mounted near its center upon said supporting member.

References Cited in the file of this patent

UNITED STATES PATENTS

| Number | Name | Date |
| --- | --- | --- |
| 2,320,117 | Ayers | May 25, 1943 |
| 2,340,877 | Hausler | Feb. 8, 1944 |
| 2,502,180 | Smulski | Mar. 28, 1950 |

FOREIGN PATENTS

| Number | Country | Date |
| --- | --- | --- |
| 164,317 | Great Britain | May 11, 1921 |